(12) United States Patent
Lackey et al.

(10) Patent No.: US 7,338,594 B2
(45) Date of Patent: Mar. 4, 2008

(54) FAUCET FILTER WITH SIGHT GLASS

(75) Inventors: Robert W. Lackey, Hickory, NC (US);
Glenn Cueman, Davidson, NC (US)

(73) Assignee: Protect Plus, LLC, Hickory, NC (US)

( * ) Notice: Subject to any disclaimer, the term of this patent is extended or adjusted under 35 U.S.C. 154(b) by 551 days.

(21) Appl. No.: 11/084,824

(22) Filed: Mar. 18, 2005

(65) Prior Publication Data

US 2006/0207920 A1    Sep. 21, 2006

(51) Int. Cl.
*B01D 35/04* (2006.01)
*B01D 35/143* (2006.01)

(52) U.S. Cl. .................. 210/85; 210/87; 210/94; 210/424; 210/460

(58) Field of Classification Search .......... 210/87, 210/85, 94, 95, 282, 424, 449, 460
See application file for complete search history.

(56) References Cited

U.S. PATENT DOCUMENTS 5,328,597 A    7/1994   Boldt, Jr. et al. ............. 210/87
6,123,837 A    9/2000   Wadsworth et al. .......... 210/87
6,258,266 B1   7/2001   Riback et al. ............... 210/234

FOREIGN PATENT DOCUMENTS

JP         10118641 A   *   5/1998

* cited by examiner

*Primary Examiner*—Terry K Cecil
(74) *Attorney, Agent, or Firm*—Charlie L. Schwab; Nexsen Pruet, LLC

(57) ABSTRACT

A faucet mounted filter device includes a horizontally disposed cylindrical part for housing a replaceable filter cartridge and a horizontally disposed arm part extending radially from the cylindrical part which has a connector on its upper side for releasable connection to a downwardly discharging water faucet. A window is provided in the cylindrical part through which the water filtration capacity gallonage is visible. A built in microprocessor with a counter delivers data to a read-out at the front end of the cylindrical part which displays the gallonage of water filtered by the filter cartridge. A sensor connected to the microprocessor senses flow of filter water and installation and removal of the cartridge causes the counter to start counting and to return to zero, respectively.

9 Claims, 3 Drawing Sheets

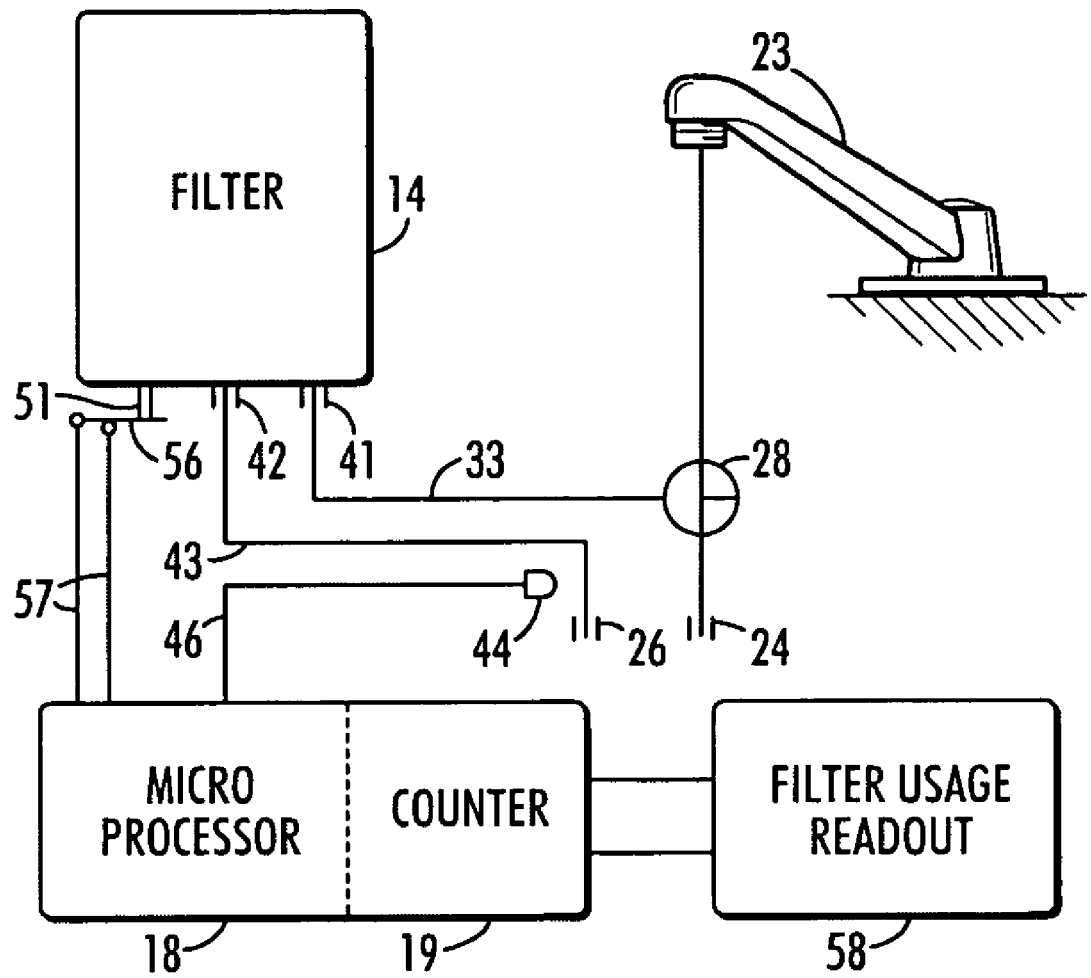

FAUCET FILTER WITH SIGHT GLASS

BACKGROUND OF THE INVENTION

Faucet mount filters for the treatment of drinking water are being increasingly used to treat water used for cooking and for drinking purposes. These devices ensure removal of a great variety of contaminants at the point of use. As the technology for removing a greater number of contaminants and impurities develop, these devices allow treatment of waters beyond that carried out by the municipal water treatment authorities as mandated by the United States Environmental Protection Agency under the Drinking Water Act of 1987. Increasingly there is recognition that the treatment of drinking water at the point of use is a more cost effective way to protect the population than treating huge quantities of water at the municipal level when only a fraction of that water is actually required for drinking and cooking, and recognizing that water used for other purposes, such as bathing or flushing toilets, does not need to be treated to the same extent as the drinking water.

With the growing popularity of faucet mounted filter devices, more convenient and consumer friendly devices are being created. Since the filter cartridge included in these devices has a limited capacity to remove the contaminant or contaminants, there is a need to indicate when the exhausted cartridge should be changed. This is accomplished by various mechanical and electronic indicators. In a typical faucet mounted filter there is a removable filter cartridge, an inlet connection, a tap water inlet passage, an unfiltered water outlet, a filtered water outlet, a passage between the filter and the filtered water outlet, a passage between the inlet passage and the unfiltered water outlet, and a valve selectively adjustable to direct unfiltered water to the unfiltered water outlet, or to the filter. Usually, a flow-reactive sensor is situated in the passage between the filter and the filtered water outlet. The flow-reactive sensor senses the flowing water and is connected to a signal generating element and power source. A signal generated by the flow reactive sensor is connected to a microprocessor, which interprets the data and activates either a time or event counter. There can also be a real time or event accumulator to accumulate the time or events during which the water flow occurs. The device may further contain a valve in communication with the power source and the signal processor, wherein the signal processor is configured to signal the valve when either the accumulated time or the event value for the water flow exceeds a set value. The device also may include a reset sensor in communication with the signal processor and positioned such that inserting a capacity rated filter cartridge in the device actuates the reset sensor. Alternatively the reset sensor could be manually altered to start again with a new filter cartridge element. The real time or event accumulator is in communication with the signal processor that is designed to activate an electronic digital indicator every time the flow event or time occurs. Further, the indicator device may be connected to two or more indicators that are activated depending on a predetermined use time or flow volume to give either early warning or intimation of complete exhaustion of the rated capacity of the filter cartridge. The flow reactive member may, for instance, be a turbine, and the signal-generating device may include a magnet or a pair of electrodes coupled with an electronic current sensing device. It can also include a pressure sensor.

The filter cartridges incorporated in faucet mounted filter devices are capacity rated to remove one or more contaminants. Since the media contained in these filters are specific to one or more contaminants, changing the media to treat other kinds of contaminants can result in a new capacity rating for the cartridge. A faucet mount device is usually able to accommodate a filter cartridge with only one capacity rating because its microprocessor is programmed to recognize only one capacity rating and resets to that one capacity rating because of the way it counts the event to zero rather than from zero. In other words, most faucet mounted filtering devices are currently configured to accept only one capacity rated filter cartridge and once reset they revert back to same capacity rating. Thus, such faucet mount devices can only be effectively used with a filter cartridge with a specific capacity rating. Filter cartridges with different specific capacity ratings require different filter devices. This is wasteful and expensive for the consumers.

BRIEF DESCRIPTION OF THE INVENTION

We have created a faucet mounted filter, which can be used with replacement filter cartridges having different gallonage capacity ratings. This is achieved by programming the microprocessor to count gallonage in increasing numbers, starting from zero, and to show gallons of water treated. The counting unit is automatically reset on changing the filter and the microprocessor puts the counter back to zero. Typically, current faucet filter mount devices count down to zero; at which time the useful life of the filter element has passed. On resetting such prior devices, they reset to the same specified single number. To facilitate the consumers to see the capacity rating for the particular filter cartridge, we have created a transparent window in the housing of the faucet mount filter, through which the user is able to see the capacity rating of the filter contained in the filter device. When the visible digital read-out on the filter device is equal to the capacity rating in the window, the user is alerted to the need to change the disposable filter cartridge element. Thus the same faucet mount device accepts filter cartridges with different volume capacities for the same contaminant and filter cartridges for different contaminants. Since the treatment requirements for drinking water for different contaminants vary according to the geographic area, this has allowed new economic flexibility for the consumers to use different filter cartridges with different capacities and capabilities in a single faucet mount filter device. The device disclosed is not limited to faucet mount filtration systems. It is equally applicable to indicator devices which can be used with other water treatment systems such as countertop, undersink, point of entry, refrigerator, and shower filters. In all of these devices, the use of this invention will allow unique flexibility and afford an economic benefit stemming from the ability to upgrade to higher capacity components without the need to replace the entire system.

BRIEF DESCRIPTION OF THE DRAWINGS

One embodiment of the invention is shown in the accompanying drawings, in which:

FIG. 5 is a schematic showing of the faucet mount filter device.

DETAILED DESCRIPTION OF THE INVENTION

Figure 1:
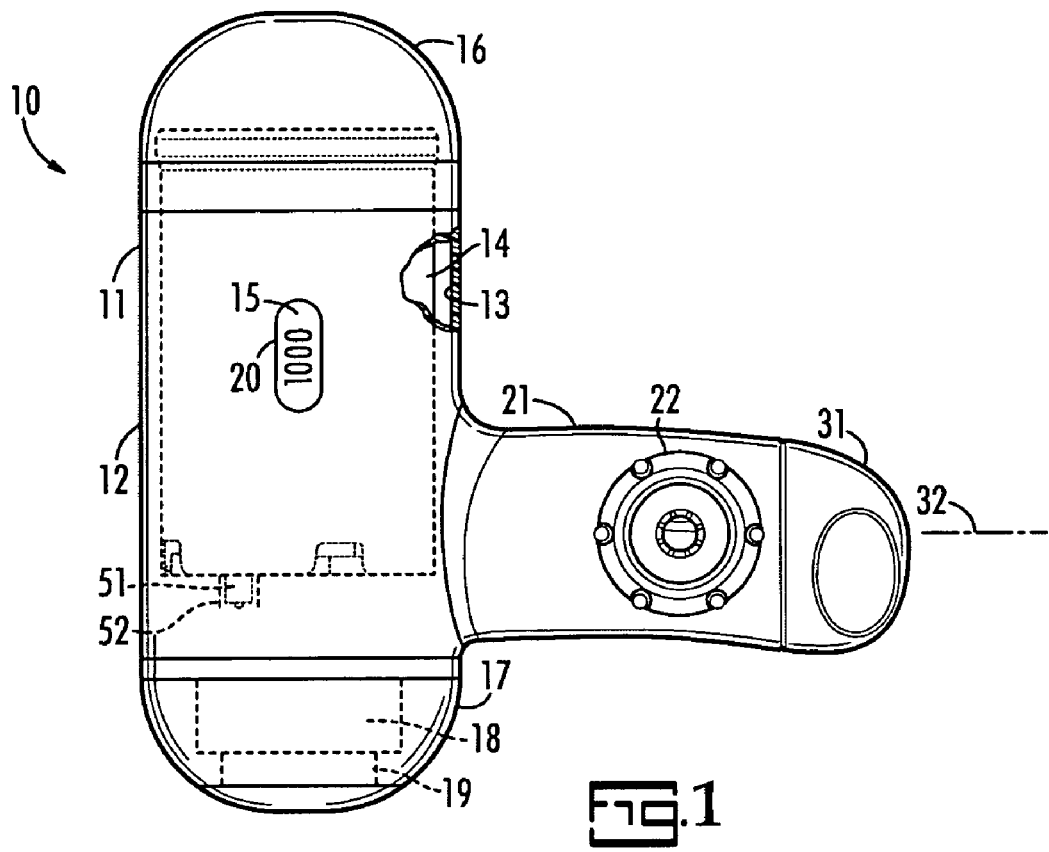
FIG. 1 is a top view of the faucet mount filter device.
Figure 2:
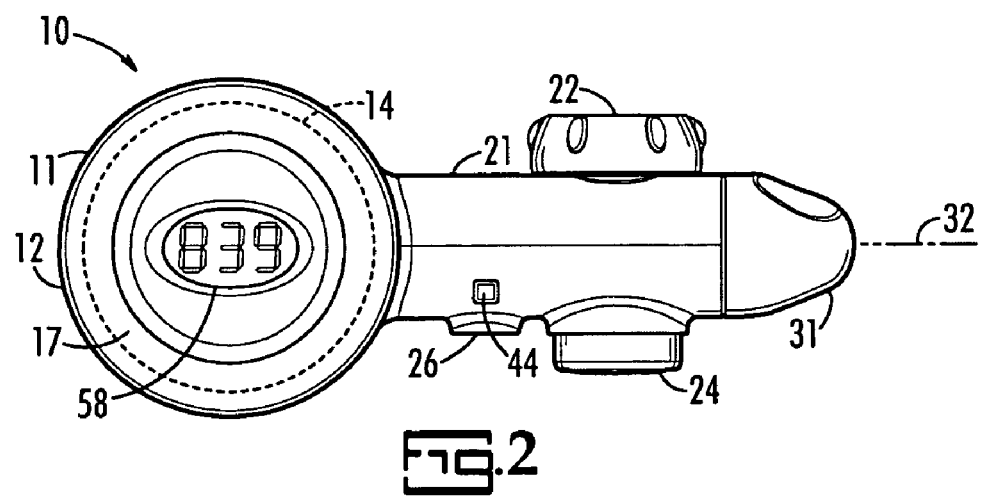
FIG. 2 is a front view of the faucet mount filter device.
Figure 3:
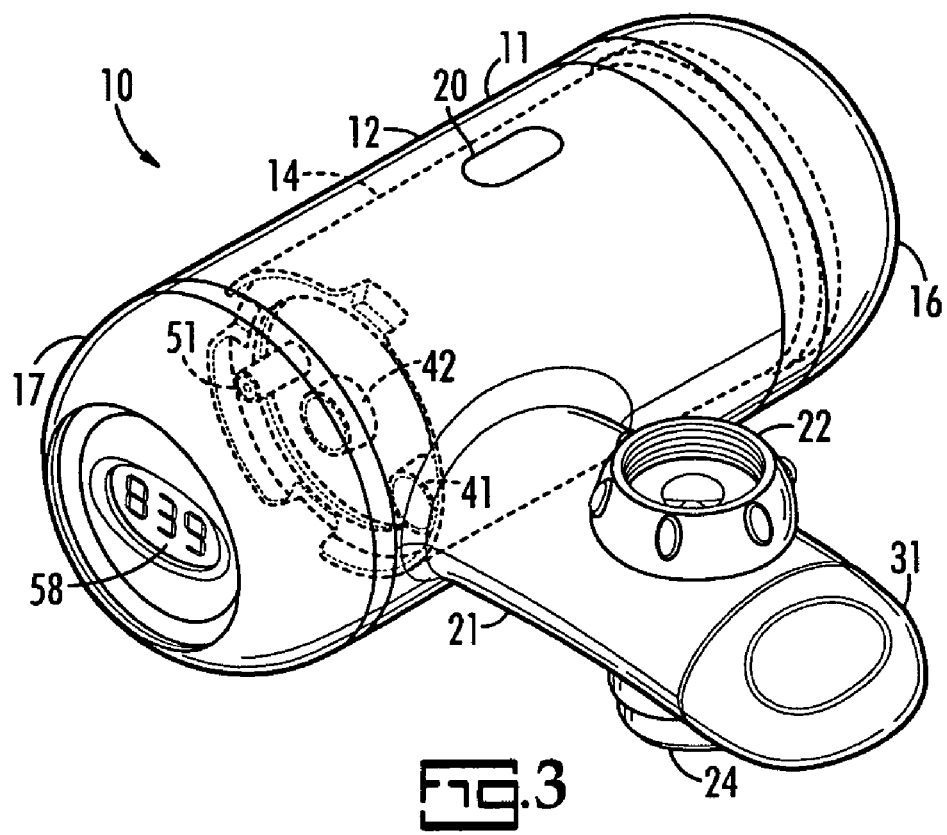
FIG. 3 is a perspective view of the faucet mount filter device.
Figure 4:
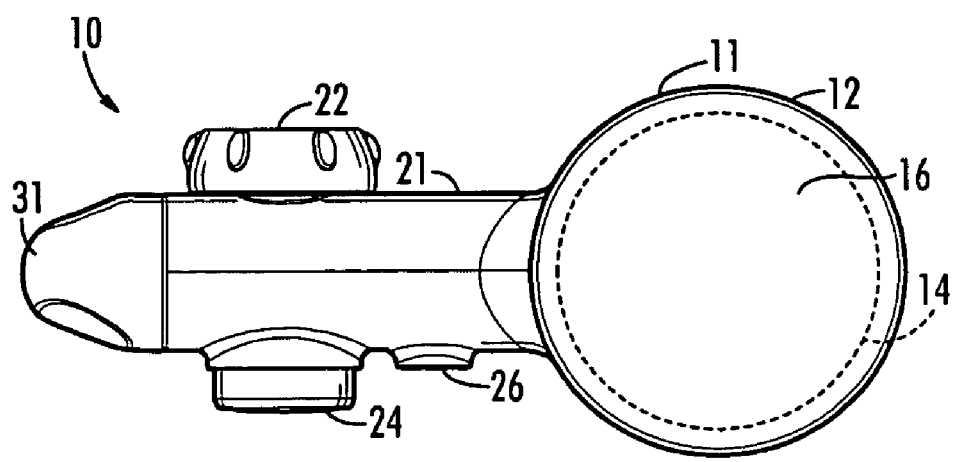
FIG. 4 is a rear view of the faucet mount filter device.

The faucet mounted filter device 10 shown in FIGS. 1 through 5 has a housing or main body 11 which includes a horizontally elongated cylindrical part 12 with a cylindrical cavity or chamber 13 for housing a replaceable cylindrical water filter cartridge 14 having its gallonage treatment capacity rating 15 printed on its cylindrical exterior. A removable end cap 16 is provided on the rear end of the cylindrical part 12 and a compartment 17 is provided at its front end which houses an electronic flow monitoring apparatus including a micro processor 18 having a counter 19. A slight glass in the form of a window 20 is provided in the cylindrical part 12 in alignment with the capacity rating 15 so that the user can see the capacity rating 15. The housing 11 also includes an arm part 21 extending radially from the cylindrical part 12 which includes an internally threaded connector 22 on its top side by which the filter device 10 is releasably connected to a standard downwardly discharging kitchen water faucet 23, shown in FIG. 5. An outlet 24 for unfiltered water is provided on the underside of the arm part 21 in vertical alignment with the connector 22. An outlet 26 for filtered water is provided on the underside of the arm part 21 between the cylindrical part 12 and the unfiltered water outlet 24. Referring also to FIG. 5, flow control apparatus is provided which includes a control knob 31 connected to a flow directing valve 28, shown schematically, near the distal end of the arm part 21. The valve 28 is rotatable about a horizontal axis 32 between a first position, shown in FIG. 5, in which tap water flows directly to the unfiltered water outlet 24 and a second position, 90 degrees counterclockwise from its first position, in which tap water is directed to the filter cartridge 14 via an internal passage 33 in the housing 11. Tap water enters the filter cartridge 14 through an inlet port 41 and filtered water exits the cartridge through an outlet port 42 and passes via an internal passage 43 to the filtered water outlet 26.

An electronic flow monitoring apparatus includes a flow reactive sensor 44 mounted in the arm part 21 at the filtered water outlet 26, which, upon sensing flow of filtered water, transmits an electrical signal to a signal processor, not shown, in the micro processor 18 through lead 46 which in turn causes a digital readout 58 to display the gallons of water filtered by the cartridge 14. The filter cartridge 14 has a cylindrical protrusion 51 at its end adjacent the compartment 17 which cooperatively engages a socket 52, shown in FIG. 1, in the housing 12, thereby serving to orient the filter cartridge 14 for proper connection of its inlet 41 and its outlet 42 with mating connections, not shown, in the cylindrical part 12. The protrusion 51, upon installation of a filter cartridge, actuates a filter cartridge presence sensor in the form of an electrical switch 56 of a circuit 57 of the micro processor 18, thereby activating a signal processor, not shown, which delivers a gallonage of filtered water count to a counter 19 when filtered water flow is detected by the flow sensor 26. Since the counter 19 includes a cumulative numerical display or digital readout 58, which shows the number of gallons filtered or treated by an installed filter cartridge 14, the user, at a glance, can compare the filtration capacity of the installed filter cartridge 14 shown in the window 20 with the digital readout 58 displaying filtration capacity actually used. By knowing the amount of the filtration capacity used and the rated capacity as shown in the window 20, the user can anticipate the timing of a replacement and take steps to ensure a replacement filter cartridge is available. The user does not need to memorize the capacity rating of the filter cartridge being used.

The herein described faucet mount filter device provides other important advantages. Filter cartridges of different capacities can be used. The counter 19 starts at zero because when a used up cartridge is removed the opening of the switch 56 resets the counter 19 to zero, and installation of a replacement filter cartridge reactivates the digital counter to count upon the sensor 14 sensing filtered water flow. There are a wide variety of replaceable filter cartridges available for removing a multitude of drinking and cooking water contaminates and there is a great variation in the nature and severity of the contamination geographically. A wide variety of filter cartridges are being marketed to reduce drinking water contaminates which adversely affect health and taste. Such cartridges have different gallonage capacities. The herein disclosed faucet mount filter accommodate such filter cartridges, even though their capacity ratings are different, because the counter starts at zero rather than starting at the rated capacity of the filter cartridge. The filter device provides unencumbered user visualization of the gallonage rating and the amount of the filtration capacity of the cartridge that has been used. Thus the user at a glance knows how much of the filter cartridge's capacity remains and is thereby forewarned of exhaustion of its usefulness.

What is claimed is:

1. A faucet mount filter device comprising:
    a housing including
        a horizontally disposed cylindrical part with a top side and longitudinally opposite front and rear ends having
            a cylindrical cavity for housing a cylindrical replaceable water filter cartridge in a predetermined orientation relative to said housing, said cartridge having a number on its exterior indicative of its water gallonage treatment capacity,
            a window aligned with said number producing visualization of said number from the exterior of said device,
            an electronic flow monitoring apparatus including a microprocessor with a counter in one of said longitudinally opposite ends of said cylindrical part and a digital read-out on said front end of said cylindrical part,
        an arm part rigidly secured to and extending radially and horizontally outward from said cylindrical part including
            a connector adapted to secure said device in water receiving relation to a downwardly discharging water faucet,
            an unfiltered water outlet and,
            a filtered water outlet, and
            flow control apparatus including a manually operable flow control valve for selectively routing water received from said faucet to said unfiltered water outlet or through said water filter cartridge to said filtered water outlet, and
        a flow sensor sensing flow of filtered water, said flow sensor being connected in signal delivery relation to said micro processor, said micro processor causing said digital read-out to display the number of gallons of water filtered by said replaceable filter cartridge.

2. The filter device of claim 1 having a filter cartridge presence sensor connected in signal delivery relation to said microprocessor.

3. The filter device of claim 2 wherein said digital readout is reset to zero when said filter cartridge is removed.

4. The filter device of claim 2 wherein said filter cartridge includes a projection on one of its axially opposite ends and said cylindrical part includes a socket for orienting said cartridge, said projection actuating a switch of a circuit of said microprocessor when said cartridge is removed causing said digital readout to reset to zero.

5. The faucet mount filter device of claim 1 wherein said electronic flow monitoring apparatus includes an electrical switch operated by said filter cartridge which causes said microprocessor to commence counting gallonage of water filtered when said filter cartridge is installed in said cavity and causes said micro processor to adjust said counter to zero when said filter cartridge is removed from said cavity.

6. A water treatment device comprising:
   a housing including a cavity for housing a replaceable water filter cartridge in a predetermined orientation relative to said housing, said cartridge having a number on its exterior indicative of its water gallonage treatment capacity,
   a window in said housing aligned with said number producing visualization of said number from the exterior of said device,
   an electronic flow monitoring apparatus including a microprocessor with a counter in said housing and a digital readout on a visible portion of the device,
   a filtered water outlet and an unfiltered water inlet, and
   a flow sensor sensing flow of filtered water, said flow sensor being connected in signal delivery relation to said microprocessor, said microprocessor causing said digital readout to display the number of gallons of water filtered by said replaceable filter cartridge.

7. The water treatment device of claim 6 having a filter cartridge presence sensor connected in signal delivery relation to said microprocessor.

8. The water treatment device of claim 6 wherein said electronic flow monitoring apparatus includes a circuit having a switch which is actuated by removal of said filter cartridge causing said digital readout to reset to zero.

9. The water treatment device of claim 6 wherein said electronic flow monitoring apparatus includes a switch actuated by said filter cartridge which causes said microprocessor to commence counting gallonage of water filtered when said filter cartridge is installed in said cavity and causing said microprocessor to adjust said counter to zero when said filter cartridge is removed from said cavity.

* * * * *